United States Patent [19]

Matifas

[11] Patent Number: 4,642,004
[45] Date of Patent: Feb. 10, 1987

[54] MACHINING DEVICE PROVIDED WITH A BLANK-PRESS CONNECTED TO THE TOOL AND BLANK-PRESS FOR SUCH A DEVICE

[75] Inventor: René Matifas, Albert, France

[73] Assignee: Societe Nationale Industrielle Aerospatiale, Paris, France

[21] Appl. No.: 773,293

[22] Filed: Sep. 6, 1985

[30] Foreign Application Priority Data

Sep. 12, 1984 [FR] France ................................ 84 13995

[51] Int. Cl.⁴ ............................ B23C 5/28; B23C 3/12
[52] U.S. Cl. ................................ 409/136; 144/242 A; 409/138
[58] Field of Search ............................ 408/56, 95, 98; 409/135, 136, 138; 144/134 A, 242 A, 242 B

[56] References Cited

U.S. PATENT DOCUMENTS

| | | | |
|---|---|---|---|
| 2,404,149 | 7/1946 | Trinkle | 409/136 |
| 3,245,321 | 4/1966 | Pankonin et al. | 409/136 X |
| 4,158,987 | 6/1979 | Smith | 409/190 X |
| 4,443,141 | 4/1984 | Kosmowski | 409/190 X |
| 4,530,627 | 7/1985 | Ksmowski | 409/190 X |

Primary Examiner—Gil Weidenfeld
Assistant Examiner—Steven C. Bishop
Attorney, Agent, or Firm—Fisher, Christen & Sabol

[57] ABSTRACT

This invention relates to a machining device incorporating a blank-press connected to the tool and to a blank-press for such a device, wherein said blank-press is provided with an annular chamber surrounding said tool and obturated opposite the workpiece by a flat face traversed by a plurality of orifices; said annular chamber comprises means for connection to a source of fluid under pressure; and said fluid emerging from the annular chamber through said orifices between the flat face of the workpiece and the flat face of the annular chamber creates a fluid film for lift. The invention is more particularly applicable to the trimming of stacks of sheet metal plates.

5 Claims, 1 Drawing Figure

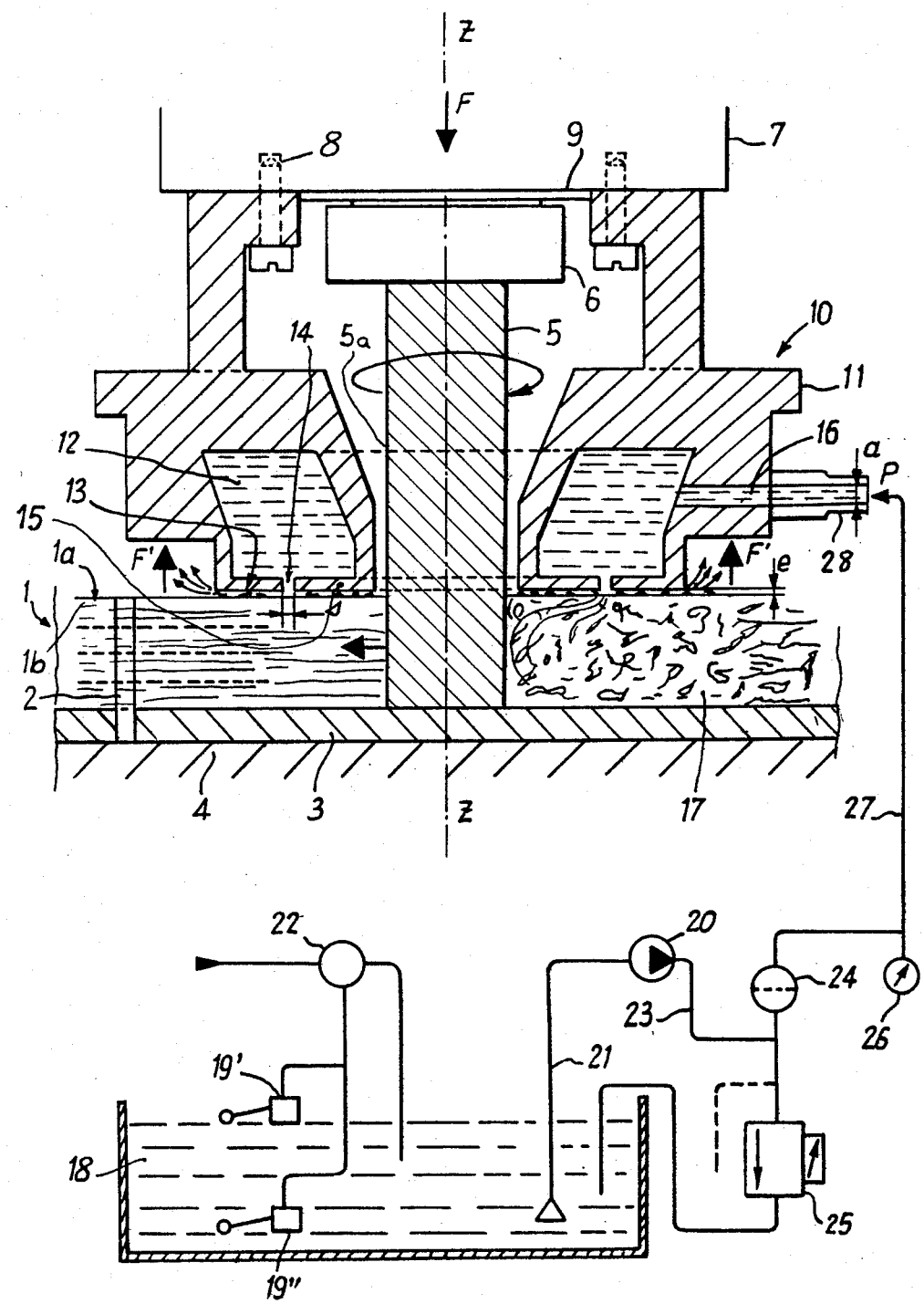

MACHINING DEVICE PROVIDED WITH A BLANK-PRESS CONNECTED TO THE TOOL AND BLANK-PRESS FOR SUCH A DEVICE

The present invention relates to a machining device provided with a blank-press connected to the tool, as well as to such a blank-press. It is particularly, although not exclusively, adapted to be used in milling and trimming devices, and in particular in devices for trimming pieces constituted by a stack of sheet metal plates. Consequently, although this cannot be considered as limiting its scope, the present invention will be set forth hereinafter in connection with this latter application.

It is known that, to trim a plurality of identical sheet metal plates, in one milling operation, a stack of such plates is fixed on the table of a milling machine, for example by means of rivets, so that, after machining and elimination of the rivets, the machined plates may easily be separated from one another for subsequent use thereof.

The operations therefore consist:

in placing the stacked sheet metal plates on a rigid table and ensuring temporary fixation by means of rivets clamping the stack and the table together;

in proceeding with the machining operation;

in eliminating the temporary rivets after the machining operation.

In order to effect trimming satisfactorily, it is indispensable that the plates composing said stack be firmly applied against one another, thus behaving like a monolithic piece. Now, the temporary fixation by rivets is not sufficient to ensure correct application of the plates on one another over the whole of their surface.

A blank-press is therefore provided, in known manner, which is connected to the trimming tool and which exerts a force of high pressure (for example of the order of a hundred daN) in the vicinity of the zone of the stack of the plates, during machining.

However, such a blank-press inevitably provokes deteriorations (scratches) on the surface of the sheet metal plate of the stack on which it presses; such deteriorations, due in particular to the introduction of chips between the blank-press and the plate, are all the greater as the pressure exerted by the blank-press is higher. This plate is therefore sacrificed and cannot be used, and this increases the cost price of the trimmed sheet metal plates.

In an attempt to remedy this drawback, it has been proposed to coat this sheet metal plate with a peel-off adhesive film; however, up to the present time, this proposition has not given satisfactory results, as said film deteriorates itself, for the same reasons, during machining and can therefore not completely perform its function.

It is therefore an object of the present invention to eliminate the problems of deterioration, by the blank-press, of the surface of the machined piece.

To this end, according to the invention, the device for machining a workpiece by means of a rotating tool mounted in a tool-holder and attacking said workpiece by its lateral machining surface, said device comprising means for imparting a movement of relative displacement between said workpiece and said tool-holder, as well as a blank-press connected to said tool-holder, surrounding the tool and exerting a local pressure on a flat face of said workpiece in the vicinity of that part thereof being machined, is noteworthy in that said blank-press is provided with an annular chamber surrounding said tool and obturated opposite said workpiece by a flat face traversed by a plurality of orifices, said annular chamber comprises means for connection to a source of fluid under pressure and said fluid emerging from the annular chamber through said orifices creates between the flat face of the workpiece and the flat face of the annular chamber a fluid film for lift.

In this way, a sort of interface containing the fluid under pressure is made between the blank-press and the workpiece, with the result that any mechanical contact therebetween is avoided, this eliminating the deteriorations mentioned hereinabove. The outside sheet metal plate of the stack is therefore protected and may be used like the others. Moreover, the presence of a fluid film between the blank-press and the workpiece makes it possible:

to improve slide between these two elements, by elimination of the mechanical friction;

to avoid introduction of any chip from machining between the blank-press and the workpiece to be machined, since the pressurized fluid escaping from said interface space to the outside repels any chips directed towards said space;

to improve cooling of the tool, and therefore its performances, since the stream of lift fluid covers said tool at least in part and enables the heat created by machining to be eliminated.

Said fluid is preferably of the lubricating type, in order in addition to lubricate the tool.

The blank-press is advantageously formed by a body of revolution disposed coaxially to the tool and the orifices passing through the flat face of the annular chamber are equally distributed angularly over a circle coaxial to said tool. In this way, said tool, equipped with its blank-press, may attack the workpiece on all sides.

However, the result of this arrangement, which is symmetrical in rotation, is that the recess machined by the tool in said workpiece lies opposite certain of said orifices for evacuating the pressurized fluid coming from the annular chamber, with the result that the formation of the lift film risks being disturbed. This disturbing effect is all the greater as the volume of the recess varies constantly as a function of machining. Now, it is essential that the effect of lift, i.e. the effort of pressure exerted by the blank-press on the workpiece, be constant, despite the variation in volume of the interface, created by machining.

To solve this problem, the pressure of the fluid, as well as the diameter and number of the orifices passing through the flat face of the annular chamber, are selected so that the resistance opposed by said orifices to the passage of the fluid is high with respect to the resistance of said means connecting the chamber to the source of fluid and with respect to the resistance that the fluid of the lift film encounters to escape laterally from the interface space.

A substantially constant distance may thus be obtained between the blank-press and the workpiece and a pressure, likewise substantially constant, may be maintained for the lift film, despite the local elimination of the interface in the machined zone.

Supply of fluid, for example soluble oil, may be ensured by a metering pump supplied from a reservoir with minimum and maximum level and a network of pipes of appropriate section, completed by a filter and a pressure gauge. The fluid escaping from the interface space may be provided to be recycled after being filtered.

In the case of the workpiece being constituted, in known manner, by a stack of sheet metal plates assembled together by rivets on a thick, rigid support, it is advantageous if the rivets are maintained in position by caulking each of their ends and if the rivets are extracted under the pressure of a rivet punch whose diameter is less than that of the rivet in order to avoid rendering the holes oval.

The present invention also relates to a blank-press for a device for machining a workpiece by means of a rotating tool mounted in a tool-holder and attacking said workpiece by its lateral machining surface, said device comprising means for imparting a movement of relative displacement between said workpiece and said tool-holder, whilst the blank-press is connected to said tool-holder and exerts a local pressure on a flat face of said workpiece in the vicinity of that part thereof being machined, said blank-press being noteworthy in that it is provided with an annular chamber surrounding said tool and obturated opposite said workpiece by a flat face traversed by a plurality of orifices and said annular chamber comprises means for connection to a source of pressurized fluid.

The invention will be more readily understood on reading the following description with reference to the accompanying drawings, in which:

The single FIGURE illustrates, in schematic cross-section, an embodiment of the invention, applied to the trimming of a stack of sheet metal plates.

Referring now to the drawing, the workpiece 1 to be trimmed is constituted by a plurality of individual sheet metal plates 1a, 1b, . . . stacked one on the other and having to be machined simultaneously. For the duration of the trimming operation, the workpiece 1 is fixed, with the aid of rivets 2, on a thick rigid support 3 itself borne on the table 4 of a milling machine and fixed thereto, by any known means (not shown). Rivets 2 ensure fixation of the workpiece 1 on the support 3 and connection of the individual sheet metal plates to one another.

The trimming device further comprises a mill 5 driven in rotation about its axis Z—Z and maintained in a tool-holder 6, itself mounted in a piece 7. The milling machine further comprises, in known manner (not shown), drive means for imparting a relative movement of displacement between the piece 7 (and therefore the tool 5) and the table 4 (and therefore the workpiece 1). In this way, the mill 5 may present six degrees of freedom of displacement with respect to the workpiece 1 and may attack the latter by its lateral machining surface 5a.

In accordance with the invention, a blank-press with effect of lift is further provided, fixed to the piece 7 via screws 8 and centred with respect to said piece 7 thanks to a shoulder 9.

This blank-press, generally referenced 10, is constituted by a body of revolution 11 of which the axis is merged with axis Z—Z and inside which is formed an annular chamber 12 coaxial to tool 5.

In order to form an interface 13 for lift effect with the outermost sheet metal plate 1a of the workpiece 1, the chamber 12 is, on the one hand, provided with orifices 14 made in its flat face 15 which obturates it opposite said workpiece 1 and, on the other hand, connected by a channel 16 and a connection 28 to a source 18 to 27 of hydraulic fluid under pressure.

In this way, the hydraulic fluid under pressure penetrating through channel 16 into the annular chamber 12 generates a lift film in the interface 13, on escaping through the orifices 14 then to the periphery of said interface.

Orifices 14 are equidistant from axis Z—Z and equally distributed angularly about this axis.

If elements 5 to 10 are applied in the direction of elements 1 to 4 with a force F, the fluid lift film, of thickness e, must allow these elements 1 to 4 to exert a force of reaction F', of equal amplitude but of opposite direction. It is therefore essential that the fluid film contained in the interface 13 be conserved despite the constitution of a machining chamber 17 which results from the work of the tool 5 on the workpiece 1.

In fact, the fluid film being destroyed in this part, it is important to define a law between:
  the pressure P of the fluid in the supply channel 16;
  the inlet section a of the supply channel 16;
  the section s and the number n of orifices 14 in the interface 13;
  the force of application F, and
  the thickness e of the interface 13.

Experience has shown that the section of the orifices 14 must be selected so that the hydraulic resistance thus constituted is high with respect to the resistance of the fluid conducting pipes from the source to the blank-press and also high with respect to the hydraulic resistance resulting from the lateral escape of the fluid from the interface.

This leads to choosing orifices 14 of small diameter and a high supply pressure P.

The characteristics of a blank-press according to the invention which gives every satisfaction and which is intended for trimming rivetted sheets of duralumin, are given hereinafter by way of example:
  outer diameter of blank-press 10: 90 mm
  inner diameter of blank-press 10: 52 mm
  active surface: about 40 cm$^2$,
  diameter of orifices 14: 2 mm
  number of orifices 14: 24, arranged equidistantly from axis Z-Z and distributed symmetrically;
  total surface of orifices 14: 72 mm$^2$
  pressure of the fluid: about 10 bars
  nature of the fluid: oil solubilized in water
  rate of flow: 85 1/min
  force of application F: about 110 daN
  thickness of interface: about 0.3 mm The source of pressurized hydraulic fluid essentially comprises a tank 18 with maximum level detector 19' and minimum level detector 19''. The fluid is soluble oil conducted to a metering pump 20 via a pipe 21.

The level of fluid in the tank 18 is maintained thanks to a supply pump 22 controlled by the level detectors 19' and 19''.

The pressurized fluid issuing from pump 20 is sent via pipe 23, on the one hand, to a filter 24 and, on the other hand, to a pressure limiter 25. A pressure gauge 26 allows the pressure in the conduit 27 connected to channel 16 to be monitored.

It must be noted that the assembly rivets 2 may advantageously be in the form of expanding rivets, this enabling the surface plate 1a of the stack 1 to be recovered since it is in no way damaged either by scratches, thanks to the device according to the invention, or by the apparent countersinkings of the rivets.

Moreover, such a type of rivet may easily be driven out, whilst conventional rivets must be pierced before being removed.

It follows from the present specification that the invention may easily be carried out on existing milling and trimming machines without any particular problem to be solved.

The invention renders the trimming operations economical, in that the top piece may be used, this not being possible heretofore.

Finally, the invention improves the work by an improved lubrication and a better cooling of the tool.

What is claimed is:

1. In a device for machining a workpiece by means of a rotating tool mounted in a tool-holder and attacking said workpiece with a lateral machining surface, said device comprising means for imparting a movement of relative displacement between said workpiece and said tool-holder, as well as a blank-press connected to said tool-holder and exerting a local pressure on a flat face of said workpiece in the vicinity of that part thereof being machined, said blank-press being provided with an annular chamber surrounding said tool and obturated opposite said workpiece by a flat face traversed by a plurality of orifices of predetermined diameter; said annular chamber comprising means for connection to a source of fluid under pressure, said means for connecting the chamber to the source of fluid causing a resistance in the fluid passing therethrough; and said fluid emerging from the annular chamber through said orifices creating in the interface space between the flat face of the workpiece and the flat face of the annular chamber a fluid film for lift, said orifices causing a resistance to said fluid passing through said orifices, and said fluid film for lift encountering a resistance as said fluid film escapes laterally from the interface space.

2. The device of claim 1 wherein said fluid presents qualities of lubrication.

3. The device of claim 1 wherein the blank-press is formed by a body of revolution disposed coaxially to the tool and the orifices passing through the flat face of the annular chamber are equally distributed angularly over a circle coaxial to said tool.

4. The device of claim 3 wherein the pressure of the fluid, as well as the diameter and plurality of orifices passing through the flat face of the annular chamber are selected so that the resistance opposed by said orifices to the passge of the fluid therethrough is high with respect to the resistance of said means for connecting the chamber to the source of fluid and with respect to the resistance that the fluid of the lift film encounters to escape laterally from the interface space.

5. Blank-press for a device for machining a workpiece by means of a rotating tool mounted in a tool-holder and attacking said workpiece with a lateral machining surface, said device comprising means for imparting a movement of relative displacement between said workpiece and said tool-holder, whilst the blank-press is connected to said tool-holder and exerts a local pressure on a flat face of said workpiece in the vicinity of that part thereof being machined, wherein it is provided with an annular chamber surrounding said tool and obturated opposite said workpiece by a flat face traversed by a plurality of orifices, and said annular chamber comprises means for connection to a source of pressurized fluid.

* * * * *